(12) United States Patent
Xu et al.

(10) Patent No.: US 11,157,513 B2
(45) Date of Patent: Oct. 26, 2021

(54) DATA SYNCHRONIZATION IN A MICRO SERVICES ENVIRONMENT

(71) Applicant: ADP, LLC, Roseland, NJ (US)

(72) Inventors: Zhitao Xu, Guttenberg, NJ (US); Daniel Rodrigo da Paz Pontes, Porto Alegre (BR); Kushal Gohil, New Brunswick, NJ (US); Tushar Phondge, Morganville, NJ (US); Frank Villavicencio, Tenafly, NJ (US); Supraja Kanapala, Roseland, NJ (US); Soham Jambhekar, Roseland, NJ (US); Lili Zhang, Roseland, NJ (US); Suthakar Maharajan, Roseland, NJ (US); Manish Patel, Roseland, NJ (US); Srilatha Usike, Roseland, NJ (US); Muhammad Nuri, Roseland, NJ (US); Deepak Kaushal, Roseland, NJ (US); Vincent Civetta, Randolph, NJ (US); Thiago Nunes Kehl, Le Pecq (FR)

(73) Assignee: ADP, LLC, Roseland, NJ (US)

(*) Notice: Subject to any disclaimer, the term of this patent is extended or adjusted under 35 U.S.C. 154(b) by 222 days.

(21) Appl. No.: 16/537,272

(22) Filed: Aug. 9, 2019

(65) Prior Publication Data
US 2021/0042321 A1    Feb. 11, 2021

(51) Int. Cl.
*G06F 16/00* (2019.01)
*G06F 16/27* (2019.01)
(Continued)

(52) U.S. Cl.
CPC ........ *G06F 16/27* (2019.01); *G06F 16/24568* (2019.01); *G06F 9/542* (2013.01)

(58) Field of Classification Search
CPC ..... G06F 16/27; G06F 16/24568; G06F 9/542
See application file for complete search history.

(56) References Cited

U.S. PATENT DOCUMENTS 7,127,520 B2 * 10/2006 Ladd ................ G06F 9/546
709/231
9,262,435 B2    2/2016 Vibhor et al.
(Continued)

OTHER PUBLICATIONS

Microsoft, Implementing event-based communication between microservices (integration events), 2018, Microsoft Docs, pp. 1-7 (Year: 2018).*

(Continued)

*Primary Examiner* — Alexander Khong
(74) *Attorney, Agent, or Firm* — Yee & Associates, P.C.

(57) ABSTRACT

A system and method for communicating events between applications. A first application receives event information for an event. A first action is performed by the first application in response to receiving the event information. The first application generates an event message comprising an event name and a message payload. The message payload comprises at least a portion of the event information. The first application publishes the event message by sending the event message to an event message pipeline. A second application may listen for the event message in the event message pipeline, receive the event message from the event message pipeline, and use the message payload to perform a second action, wherein the second action is different from the first action.

27 Claims, 5 Drawing Sheets

(51) Int. Cl.
    *G06F 16/2455*    (2019.01)
    *G06F 9/54*    (2006.01)

(56) References Cited

U.S. PATENT DOCUMENTS

| | | |
|---|---|---|
| 9,552,366 B2 | 1/2017 | Suryanarayanan et al. |
| 9,881,279 B2 | 1/2018 | Cooper et al. |
| 2015/0142719 A1* | 5/2015 | Behuria ................ G06F 16/275 706/48 |
| 2015/0142737 A1* | 5/2015 | Behuria ................ G06F 16/273 707/613 |
| 2015/0142740 A1* | 5/2015 | Behuria ................ G06F 40/18 707/634 |
| 2016/0364650 A1* | 12/2016 | Fletcher ................ G06N 5/046 |
| 2017/0161333 A1* | 6/2017 | Chen ................ G06F 16/2453 |
| 2019/0342178 A1* | 11/2019 | Balasubramanian .. G06N 5/047 |
| 2020/0019543 A1* | 1/2020 | Wang ................ G06F 9/3836 |

OTHER PUBLICATIONS

Preuveneers et al., "Access Control with Delegated Authorization Policy Evaluation for Data-Driven Microservice Workflows," Future Internet, 2017, vol. 9, Issue 4, 21 pages.

\* cited by examiner

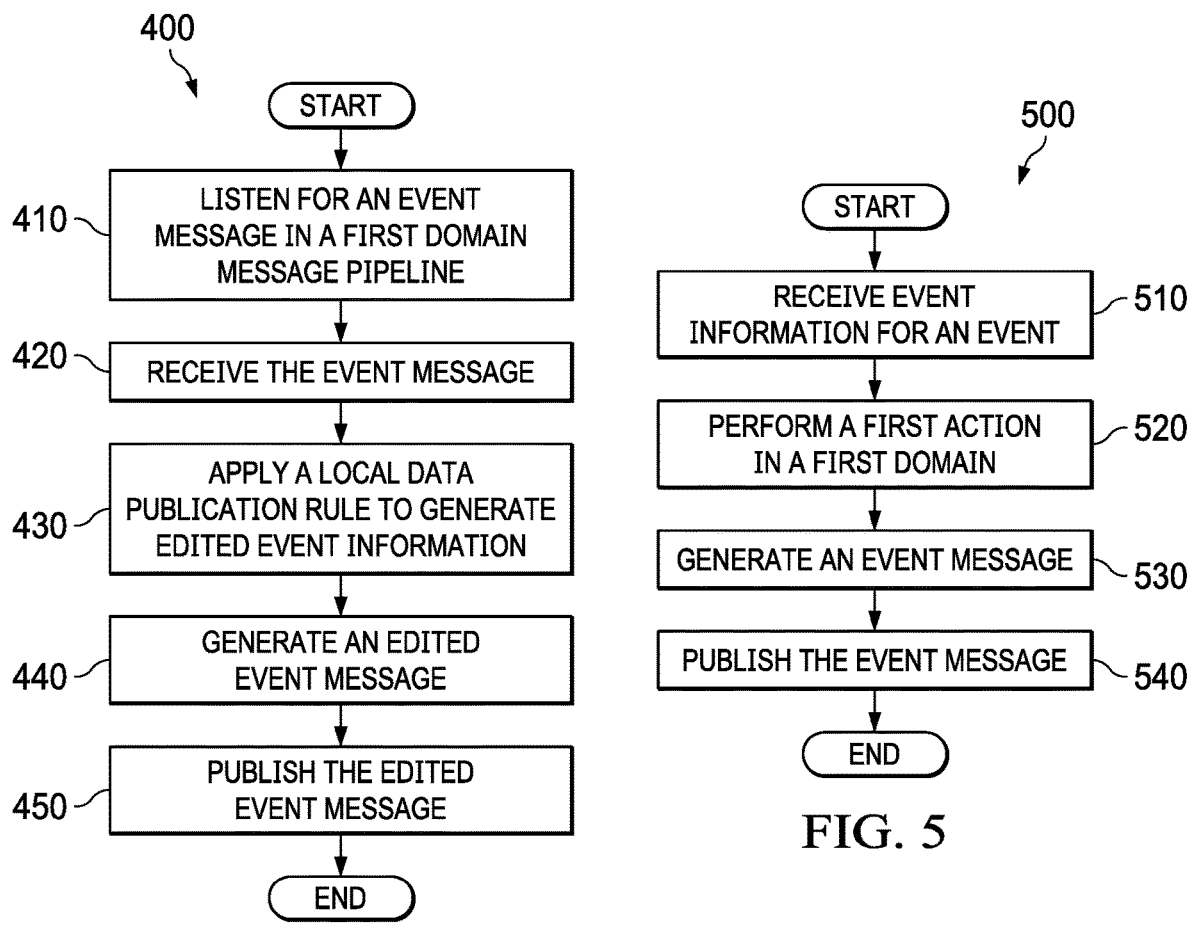
FIG. 4
FIG. 5
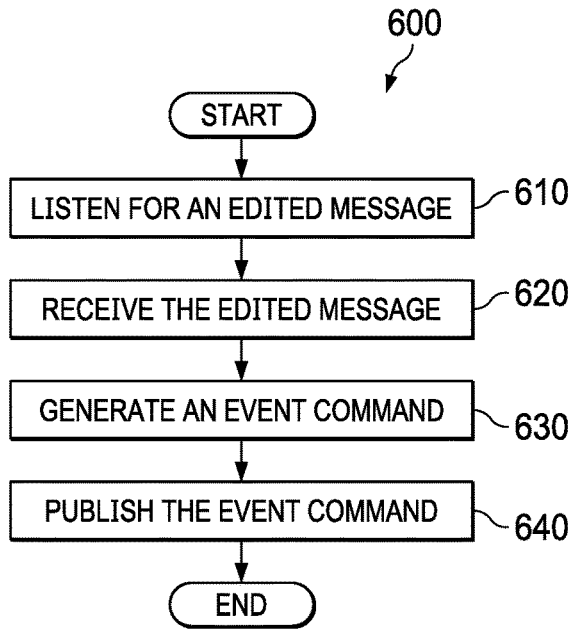
FIG. 6

DATA SYNCHRONIZATION IN A MICRO SERVICES ENVIRONMENT

BACKGROUND INFORMATION

1. Field

The present disclosure relates generally to computer applications running in an information processing system and to the communication of information between such applications. More particularly, the illustrative embodiments are related to maintaining data synchronization in a micro services environment across services provided to different geographic regions having different data privacy regulations and synchronization requirements in a computer-implemented human capital management system.

2. Background

An organization, such as a business entity or another appropriate organization, may use a variety of different applications to perform a variety of different actions. For example, a business organization may use a variety of different applications to perform a variety of different actions related to human capital management. Human capital management also may be referred to as human resource management.

An application is a computer program that is designed to run on a data processing system to perform a group of coordinated functions, tasks, or activities for the benefit of a user. An application also may be referred to as an app, an application program, or a software application.

Within large organizations, access to particular applications and data is often restricted particular departments and employees. In order to effectively control access, organizations implement an identity management system to verify the user's identity and enforce access restrictions based on the determined identity.

However, current identity management systems lack a global solution to support global organizations that have employees in multiple countries. Gaps in product coverage often necessitate the use of multiple human resource management products and systems. However, siloed and regional identity solutions, often lacking of single identifier and single sign-on, make interoperations across different products more difficult than desired. Additionally, these different regional identity solutions often frustrate compliance with international privacy requirements.

Furthermore, the rigid architecture of current identity management systems leads increased costs when introducing new capabilities and upgrades. Furthermore, the monolithic nature of current identity management systems increases operational risks, often requiring extensive regression testing and change management.

Accordingly, it would be beneficial to have a method and apparatus that take into account one or more of the issues discussed above, as well as other possible issues. For example, it would be beneficial to have a method and apparatus for effectively providing a global identity management system that enables the use of the same human resource management products and systems while also conforming with data privacy regulations for the different locations. More particularly, it would be beneficial to have a method and apparatus for maintaining data synchronization across common services provided to different geographic regions having different data privacy regulations.

SUMMARY

The illustrative embodiments provide a method of maintaining data synchronization across services provided to different geographic regions having different data privacy regulations. An outbound global data synchronization reactor listens for an event message in a first domain message pipeline. The event message comprises an event name and a message payload comprising event information for an event. The outbound global data synchronization reactor receiving the event message. The outbound global data synchronization reactor applies a local data publication rule to the event information to generate edited event information. The local data publication rule comprises a set of data nodes that are composed into a structured data object according to a domain specific language. The outbound global data synchronization reactor generates an edited event message. The edited event message comprises the event name and a message payload comprising the edited event information. The outbound global data synchronization reactor publishes the edited event message by sending the edited event message to a global message pipeline.

The illustrative embodiments also provide a computer system for maintaining data synchronization across services provided to different geographic regions having different data privacy regulations. The computer system comprises a set of hardware processors, and an outbound global data synchronization reactor executing in a first domain. The outbound global data synchronization reactor listens for an event message in a first domain message pipeline. The event message comprises an event name and a message payload comprising event information for an event. The outbound global data synchronization reactor receiving the event message. The outbound global data synchronization reactor applies a local data publication rule to the event information to generate edited event information. The local data publication rule comprises a set of data nodes that are composed into a structured data object according to a domain specific language. The outbound global data synchronization reactor generates an edited event message. The edited event message comprises the event name and a message payload comprising the edited event information. The outbound global data synchronization reactor publishes the edited event message by sending the edited event message to a global message pipeline.

The illustrative embodiments also provide a computer program product for maintaining data synchronization across services provided to different geographic regions having different data privacy regulations. The computer program product comprises a non-transitory computer readable storage media having program code stored thereon. The program code includes code for listening, by an outbound global data synchronization reactor, for an event message in a first domain message pipeline. The event message comprises an event name and a message payload comprising event information for an event. The program code includes code for receiving the event message by the outbound global data synchronization reactor. The program code includes code for applying a local data publication rule to the event information, by the outbound global data synchronization reactor, to generate edited event information. The local data publication rule comprises a set of data nodes that are composed into a structured data object according to a domain specific language. The program code includes code for generating an edited event message, by the outbound global data synchronization reactor. The edited event message comprises the event name and a message payload comprising the edited event information. The program code includes code for publishing the edited event message, by the outbound global data synchronization reactor, by sending the edited event message to a global message pipeline.

Various features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, objectives, and features thereof, will best be understood by reference to the following detailed description of an illustrative embodiment of the present disclosure when read in conjunction with the accompanying drawings, wherein:

FIG. 4 is a flowchart of a process for maintaining data synchronization across services provided in a local region in accordance with an illustrative embodiment;

FIG. 5 is a flowchart of a process for generating an event for data synchronization across services provided to different geographic regions in accordance with an illustrative embodiment;

FIG. 6 is a flowchart of a process for maintaining data synchronization across services provided in a remote region in accordance with an illustrative embodiment.

DETAILED DESCRIPTION

Figure 1:
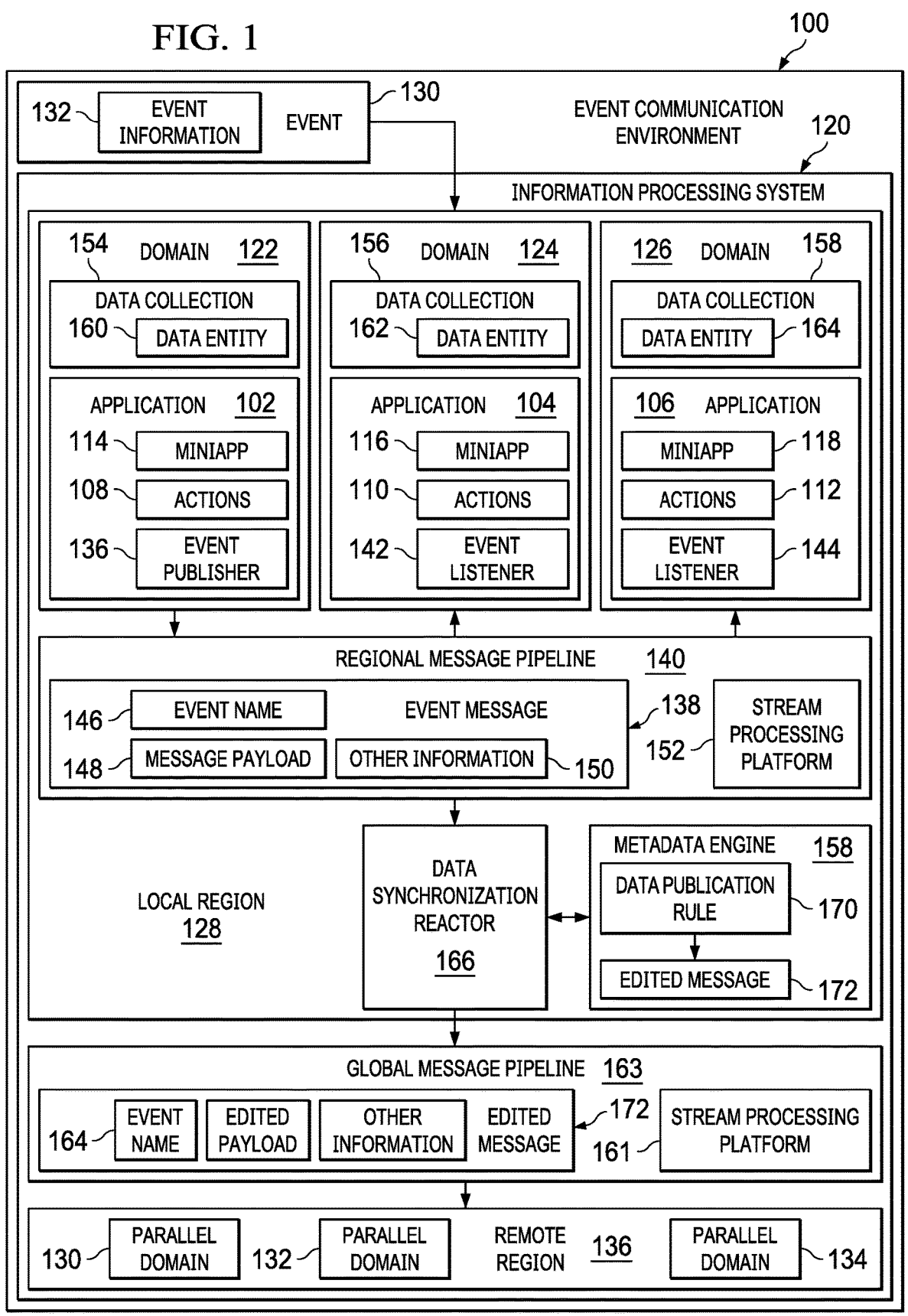
FIG. 1 is a block diagram of an event communication environment in accordance with an illustrative embodiment.

The different illustrative embodiments recognize and take into account a number of different considerations. "A number," as used herein with reference to items, means one or more items. For example, "a number of different considerations" are one or more different considerations.

The illustrative embodiments recognize and take into account that a business organization or other entity may use various different applications running on an information processing system to perform various different actions. "Actions" performed by an application also may be referred to as functions, tasks, or activities. For example, without limitation, a business organization may use a plurality of different applications to perform various different actions in a computer-implemented system for human capital management.

The illustrative embodiments recognize and take into account that a variety of different applications in use by an organization may perform a variety of different actions in response to the occurrence of the same event. Therefore, it is desirable that information regarding the occurrence of the event is provided effectively to the various different applications that perform actions in response to the occurrence of the event. For example, one application for performing actions in response to the occurrence of an event may receive event information regarding the occurrence of the event. In this case, it is desirable that the event information received by the one application is communicated effectively to other applications that perform other actions in response to the event.

The illustrative embodiments provide a method and system for communicating information between computer applications using a publication and subscription model. In accordance with an illustrative embodiment, an application that receives information as input to perform an action also may publish that information for use by other applications. Other applications may listen for the publication of the information by the first application and receive the published information to perform different actions using the information. For example, without limitation, the information received and published by the first application, and used by the first application and the other applications to perform various different actions, may be event information regarding the occurrence of an event.

For example, without limitation, the illustrative embodiments provide a system and method for the communication of event information regarding the occurrence of business events between applications for performing various different actions in a computer-implemented human capital management system. For example, without limitation, the illustrative embodiments may provide for the communication of event information regarding the occurrence of business events between a plurality of miniapps for performing various different actions in a computer-implemented human capital management system. In accordance with an illustrative embodiment, multiple actions may be grouped together in a miniapp as one business event.

The illustrative embodiments recognize and take into account that the communication of event information between applications for performing different actions using the event information may be achieved by relatively tight coupling between the applications running in an information processing system. However, the illustrative embodiments also recognize and take into account that it may be desirable to have a relatively looser coupling between applications to improve the scalability and resiliency of the system architecture. Looser coupling between applications may support an increase in the complexity and quantity of applications that may be provided to perform a variety of actions in an information processing system.

The publication and subscription model for the communication of event information between applications in accordance with an illustrative embodiment provides for the communication of event information between applications using a loose coupling between applications. In accordance with an illustrative embodiment, the communication of event information between applications is provided without any direct dependencies between applications. Therefore, the illustrative embodiments provide for the communication of event information between various applications that may be deployed independently.

Illustrative embodiments provide a distributed system for the communication of event information between applications. In accordance with an illustrative embodiment, an application that receives event information may publish the event information to communicate the event information to multiple subscribing applications at the same time. Therefore, multiple actions may be performed by multiple subscribing applications simultaneously.

Systems and methods for the communication of events between applications in accordance with an illustrative embodiment also provide for more easy integration with other applications. In accordance with an illustrative embodiment, both inbound and outbound business events may be exposed to externally developed applications, miniapps, or other products.

Turning to FIG. 1, an illustration of a block diagram of an event communication environment is depicted in accordance with an illustrative embodiment. Event communication environment 100 may be any appropriate environment in which a plurality of applications 102, 104, and 106 are run to perform a plurality of corresponding actions 108, 110, and 112. An event communication environment in accordance with an illustrative embodiment may include more or fewer applications to perform more or fewer actions than are illustrated as an example in FIG. 1. An event communication environment in accordance with an illustrative embodiment may include any appropriate number of applications to perform any appropriate number of actions.

One or more of applications 102, 104, and 106 may be implemented as miniapps 114, 116, and 118, respectively. For example, without limitation, one or more of applications 102, 104, and 106 used to perform corresponding actions 108, 110, and 112 by or for a business or other entity may be implemented as miniapps 114, 116, and 118, respectively.

Miniapps 114, 116, and 118 are relatively small or simple, discrete, user facing applications. For example, miniapp 114, 116, or 118 may be configured to provide only one function or a few functions for a user. Miniapps 114, 116, and 118 may be built using building blocks, as described, for example, in U.S. Pat. No. 10,019,242, entitled "User Interface Engine for Miniapp Development," which is incorporated by reference herein in its entirety. In this example, building blocks are distinct, atomic units of functionality executable by a computer to perform a function. Multiple building blocks may be combined together to form miniapp 114, 116, or 118. In some cases, miniapp 114, 116, or 118 may be formed by a single building block.

Event communication environment 100 may be implemented in information processing system 120. Information processing system 120 may comprise any appropriate system for running applications 102, 104, and 106. For example, information processing system 120 may comprise one or more computers. Information processing system 120 may comprise a plurality of computers that may be connected in communication with each other by any appropriate local or distributed network. For example, without limitation, information processing system 120 may be implemented using data processing system 700 in FIG. 7.

Information processing system 120 may be operated by or for any appropriate entity to perform any appropriate actions 108, 110, and 112 for the entity. For example, without limitation, information processing system 120 may be operated by or for a business entity, a government entity, a military organization, a charitable organization, an educational organization, a scientific or research entity, or any other appropriate entity or combination of entities.

Applications 102, 104, and 106 running in information processing system 120 may perform any corresponding actions 108, 110, and 112 that are appropriate for the entity for which information processing system 120 is operated. For example, without limitation, when information processing system 120 is operated by or for a business entity, applications 102, 104, and 106 may perform corresponding actions 108, 110, and 112 that are related to managing the human resources of the business entity. In this case, applications 102, 104, and 106 running on information processing system 120 may implement a human capital management system for the business entity.

In accordance with an illustrative embodiment, applications 102, 104, and 106 perform corresponding actions 108, 110, and 112 in different corresponding domains 122, 124, and 126. Each of domains 122, 124, and 126 may include corresponding application 102, 104, or 106 for performing corresponding actions 108, 110, or 112. Each of domains 122, 124, and 126 may include one or more other applications, not shown in FIG. 1, for performing other actions in domain 122, 124, or 126. The actions performed by the one or more applications with each of domains 122, 124, and 126 may be relatively closely related to each other. For example, without limitation, the actions performed by the applications with each of domains 122, 124, and 126 may be directed to similar or related tasks. However, the actions performed by the applications within each one of domains 122, 124, and 126 are different from the actions performed by the applications within other ones of domains 122, 124, and 126.

In accordance with an illustrative embodiment, each of domains 122, 124, and 126 may be directed to a different organizational aspect of the business entity. For example, without limitation, each of domains 122, 124, and 126 may be directed to a different organization, product, associate, person, account, identity provider, or other suitable aspect of the business entity within the context of local region 128. In this illustrative example, each of domains 122, 124, and 126 is designed as a single MicroService that can be developed, tested, and deployed separately from other ones of domains 122, 124, and 126.

In accordance with an illustrative embodiment, each of domains 122, 124, and 126 has its own data collection 154, 156, and 158. Each of data collection 154, 156, and 158, respectively stores one or more data entity 160, 162, 164, that relate to applications within corresponding domains 122, 124, and 126. In this illustrative embodiment, each data entity 160, 162, 164 is stored as a standalone JSON document having a universal unique identifier (UUID) that serves as a primary search key for the document, and can be used as a sharding key for a database sharding policy.

Therefore, in this example, actions 108 performed by application 102 in domain 122 are different from actions 110 and 112 performed by corresponding applications 104 and 106 in corresponding domains 124 and 126, respectively. Actions 110 performed by application 104 in domain 124 are different from actions 108 and 112 performed by corresponding applications 102 and 106 in corresponding domains 122 and 126, respectively. Actions 112 performed by application 106 in domain 126 are different from actions 108 and 110 performed by corresponding applications 102 and 104 in corresponding domains 122 and 124, respectively.

Different ones of actions 108, 110, and 112 are performed by corresponding applications 102, 104, and 106 in response to the occurrence of event 130. The occurrence of event 130 may be indicated by event information 132. Event information 132 may merely identify event 130 or otherwise indicate that event 130 has occurred. Alternatively, event information 132 may include additional information regarding event 130. Some or all of event information 132 may be used by applications 102, 104, and 106 as input to perform corresponding actions 108, 110, and 112, respectively.

Event information 132 indicating the occurrence of event 130 may be received by a first one of applications 102, 104, and 106. For example, event information 132 may be received by application 102. Event information 132 may be received by application 102 in any appropriate manner. For example, an operator may provide event information 132 to information processing system 120 for use by application 102. The operator may be a human operator, an automated device or system for providing event information 132, or a human operator in combination with an automated system. When the operator is a human operator, event information 132 may be provided to application 102 in an appropriate user interface provided by application 102.

Upon receiving event information 132, application 102 may use event information 132 to perform actions 108. In accordance with an illustrative embodiment, application 108 may communicate event information 132 to other applications 104, 106, and 108 by publishing event information 132. For example, application 102 may include event publisher 136. Event publisher 136 may be configured to publish event information 132 in the form of event message 138. Event publisher 136 may be configured to generate event message 138 based on event information 132 and to publish event message 138 by sending event message 138 to regional message pipeline 140. In this example, application 102 may be referred to as a publishing application.

Other applications 104 and 106 may be configured to listen for the publication of event message 138 on regional message pipeline 140. For example, applications 104 and 106 may include corresponding event listeners 142 and 144. Event listeners 142 and 144 may be configured to listen for the publication of a relevant event message on regional message pipeline 140 and to receive a relevant message from event message pipeline 140 in response to identifying the publication of the relevant event message on regional message pipeline 140. In this example, event message 138 is relevant to applications 104 and 106 because corresponding actions 110 and 112 are performed by applications 104 and 106 in response to the occurrence of event 130 identified in event message 138. Therefore, in this example, event listeners 142 and 144 will identify the publication of event message 138 on regional message pipeline 140 and will receive event message 138 from regional message pipeline 140. Applications 104 and 106 may then perform corresponding actions 108 and 112 using event information 132 from received event message 138. In this example, applications 104 and 106 may be referred to as subscribing applications.

Event message 138 may include event name 146 and message payload 148. Event name 146 may be used by subscribing applications 104 and 106 to identify the publication of relevant event message 138 on regional message pipeline 140. Message payload 148 may include some or all of event information 132 for event 130. Event message 138 also may include other information 150 as may be appropriate.

Regional message pipeline 140 may be implemented in any appropriate manner. For example, regional message pipeline 140 may be implemented as stream processing platform 152. For example, without limitation, regional message pipeline 140 may be implemented using Apache Kafka open-source stream processing software platform or any other appropriate stream processing platform 152. Regional message pipeline 140 may be implemented as part of information processing system 120. Alternatively, regional message pipeline 140 may be implemented separate from information processing system 120, in whole or in part.

One or more actions 108, 110, and 112 performed by one or more corresponding applications 102, 104, and 106 may affect one or more parallel domains 130, 132, and 134 of any equivalent organization, product, associate, person, account, identity provider, or other suitable aspect of the business entity within the context of remote region 136. In accordance with an illustrative embodiment, actions 108, 110, and 112 are performed by applications 102, 104, and 106 within the context of local region 128. When actions 108, 110, and 112 are performed in local region 128, data, often should be synchronized to remote region 136, wherein applications executing within parallel domains 130, 132, and 134 perform parallel actions in the context of remote region 136.

Remote region 136 is external to local region 128 on which applications 102, 104, and 106 are running. For example, a system may be external to information processing system 120 if it does not use the resources of information processing system 120 to perform actions. In other words, a system that is external to information processing system 120 would not be considered to be a part of information processing system 120 by a person of ordinary skill in the art. Alternatively, remote region 136 may correspond to a different geographic region having different data privacy regulations as compared to local region 128.

For example, one or more actions 108, 110, and 112 performed by applications 102, 104, and 106 may affect remote region 136. Actions 108, 110, and 112 performed by applications 102, 104, and 106 may control the operation of parallel domains 130, 132, and 134 to perform an action or may affect the operation of parallel domains 130, 132, and 134 in any other appropriate manner. For example, without limitation, one or more actions 108, 110, and 112 performed by applications 102, 104, and 106 may generate a message or signal that may be provided to remote region 136 to affect the operation of parallel domains 130, 132, and 134.

Whatever events are published, regional message pipeline 140 consumes events and provides them to data synchronization reactor 166. Reactors are software programs, or hardware alone, which are programmed to take action in response to events or reactors. Using metadata engine 158, data synchronization reactor 166 enables synchronizing data collection 154, 156, and 158 to parallel domains 130, 132 and 134 while respecting privacy regulations of local region 128.

Metadata engine 158 is hardware or software which is used to interpret or execute business rules in a business system. Metadata engine 158 can be software residing in a Web browser on information processing system 120. However, the illustrative embodiments are not necessarily limited to only client computers or Web browsers.

Metadata engine 158 is a code interpreter designed for a domain-specific language entirely composed of structured data objects. In one illustrative example, metadata engine 158 takes the form of an abstract syntax tree (AST) interpreter with the exception that the abstract syntax tree (AST) structure is composed of well-defined data nodes constructs, joined together in a domain-specific language. Because the data node constructs are well-defined when they are constructed, metadata engine 158 executes the composition of structured data objects without compilation. Data node constructs are composed into well-defined structured data objects according to selected block types and properties, replacing the tokenization and parsing that would otherwise occur during compilation.

Metadata engine 158 uses one or more of data publication rule 170 to enable global message pipeline 163 to consume event message 138 in a manner respecting privacy regulations of local region 128. Additionally, metadata engine 158 uses one or more of data publication rule 170 to enable organizations to control publication of event message 132 to different ones of remote region 136. In this illustrative example, each of data publication rule 170 is a structured data object composed of well-defined data nodes that are linked together according to a domain specific language.

Metadata engine 158 generates edited message 172 by applying data publication rule 170 to event message 138. For example, information extracted from event message 138, including one or more of event name 146, message payload 148, and other information 150, is mapped to data publication rule 170. Metadata engine 158 interprets event message 138 within the context of local region 128, to generate edited message 172. Data synchronization reactor 166 publishes edited message 172 to global message pipeline 163 for consumption by one or more of remote region 128.

Global message pipeline 163 may be implemented in any appropriate manner. For example, global message pipeline 163 may be implemented as stream processing platform 161. For example, without limitation, global message pipeline 163 may be implemented using Apache Kafka open-source stream processing software platform or any other appropriate stream processing platform 161. Global message pipeline 163 may be implemented as part of information processing system 120. Alternatively, global message pipeline 163 may be implemented separate from information processing system 120, in whole or in part.

Figure 2:
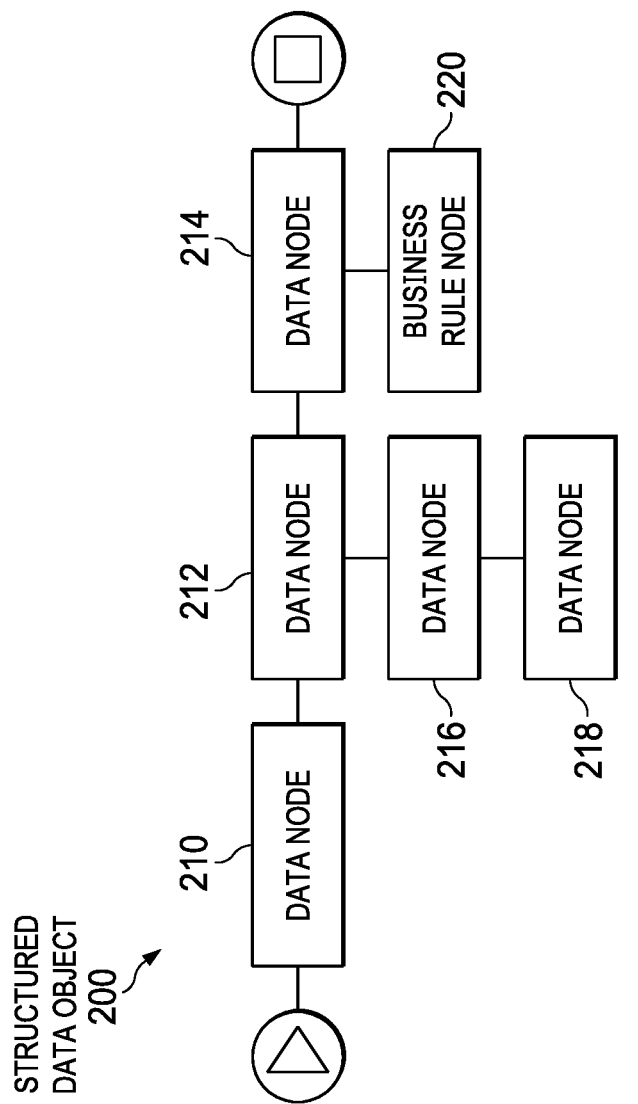
FIG. 2 is a block diagram of a structured data object in accordance with an illustrative embodiment.

With reference next to FIG. 2, an illustration of a block diagram of a structured data object is depicted in accordance with an illustrative embodiment. Structured data object 200 is an example of a composition of well-defined data nodes that can be linked together according to a domain specific language to create miniapps, collections, or bundles in a user-perceived codeless development environment.

Structured data object 200 includes data nodes 210, 212, and 214. Data nodes 210, 212, and 214 are well-defined structured data objects that can be manipulated within a data and structured data binding application to create desired business rules. Each of data nodes 210, 212, and 214 correlate to one or more functions, which in turn can be interpreted by metadata engine 158 of FIG. 1 for implementing the corresponding business rule, such as data publication rule 170 of FIG. 1. The different permutations of the compositions of these functions, as well as differentiated input, enable the execution of the different business rule behaviors at runtime.

The functions of data nodes 210, 212, and 214 operate inside of a context defined at the beginning of the business rule execution step, which is the target object for all symbols defined in the course of the business rule execution, as well as for all input to and output from the business rule itself. In this manner, data nodes 210, 212, and 214 act as a configuration object to the code being executed, defining an execution context (or scope being executed against) to other joined data nodes.

For example, structured data object 200 further includes data node 216. Data node 216 provides additional context for execution of related data node 212. Specifically, data node 216 may indicate that data node 212, as well as child data nodes thereof, should be interpreted within the context of data node 216.

Structured data object 200 further includes data node 218. Data node 218 provides additional context for execution of both related data node 212 and data node 216. For example, data node 218 may indicate that information required for execution of data node 212 should be requested and received from one or more web services. Data node 218 requests and returns the same context updated with the information received through the web services.

Structured data object 200 further includes business rule node 220. Business rule node 220 provides additional context for execution of related data node 214. Specifically, business rule node 220 may indicate a consuming service for receipt of business rule output provided by related data node 214. Business rule node 220 requests and returns information to a consuming service, such as data synchronization reactor 166 of FIG. 1.

Figure 3:
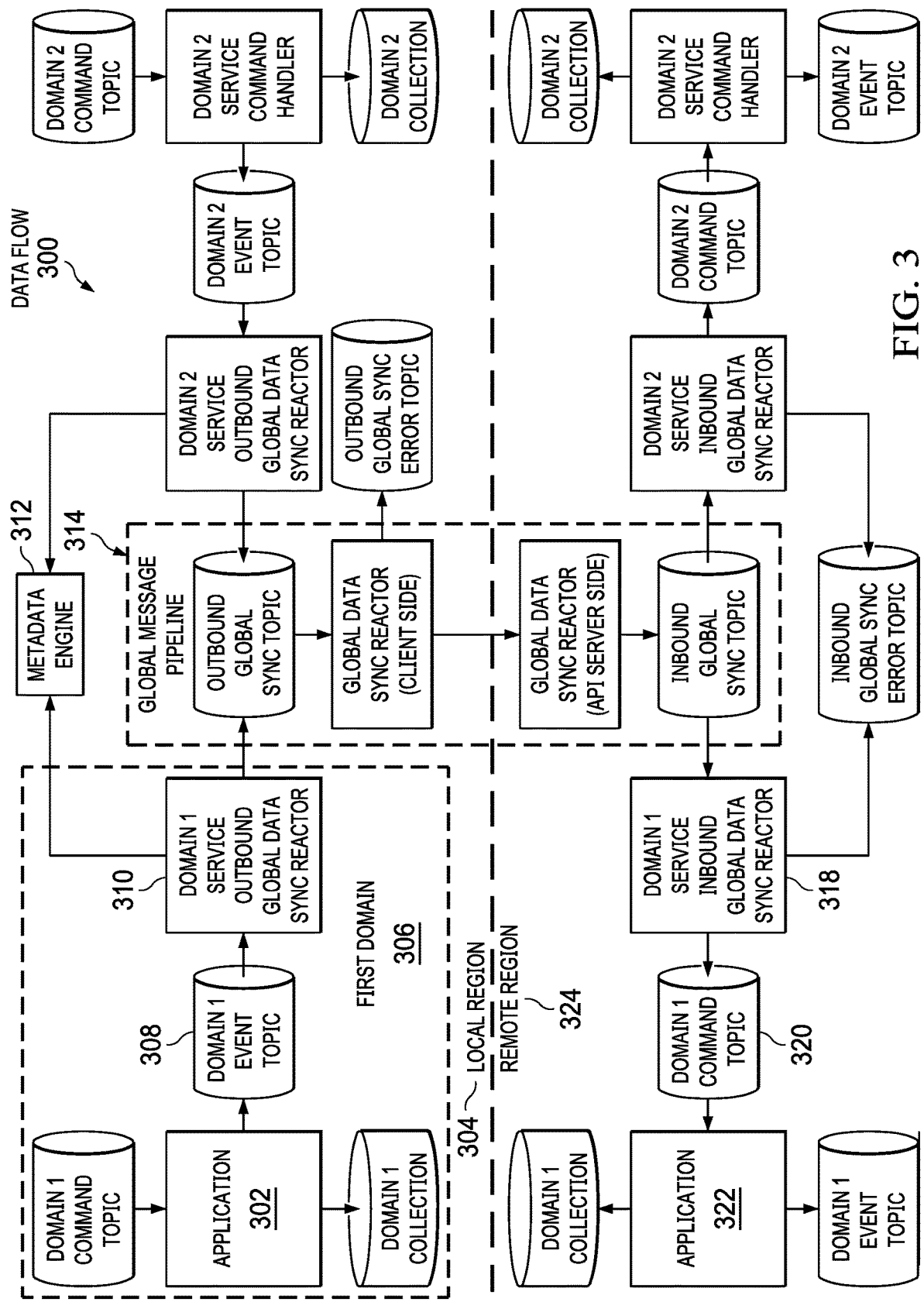
FIG. 3 is a data flow for maintaining data synchronization across services provided to different geographic regions having different data privacy regulations in accordance with an illustrative embodiment.

Turning to FIG. 3, an illustration of a data flow for maintaining data synchronization across services provided to different geographic regions having different data privacy regulations in accordance with an illustrative embodiment. Data flow 300 can be implemented within an event communication environment, such as event communication environment 100 in FIG. 1.

Application 302 in local region 304 receives event information for an event; in response to receiving the event information, application 302 performs a first action in first domain 306 of local region 304.

Application 302 in first domain 306 generates an event message. The event message is an example of event message 138 of FIG. 1. The event message can comprise an event name and a message payload, wherein the message payload comprises the event information. Application 302 in first domain 306 publishes the event message by sending the event message to the first domain message pipeline 308.

Outbound global data synchronization reactor 310 listens for an event message in first domain message pipeline 308. Outbound global data synchronization reactor 310 is an example of data synchronization reactor 166, shown in block form in FIG. 1. An event message in first domain message pipeline 308 is an example of event message 138 of FIG. 1, and comprises an event name and a message payload comprising event information for an event.

In response to receiving the message, outbound global data synchronization reactor 310 uses metadata engine 312 to apply a local data publication rule to the event information. Metadata engine 312 is an example of metadata engine 168 of FIG. 1. The local data publication rule is an example of data publication rule 170 of FIG. 1, and comprises a set of data nodes that are composed into a structured data object according to a domain specific language. Metadata engine 312 applies a local data publication rule to generate edited event information.

Using metadata engine 312, outbound global data synchronization reactor 310 generates an edited event message. The edited event message is an example of edited message 160 of FIG. 1, and comprises the event name and a message payload comprising the edited event information.

In one illustrative example, metadata engine 312 applies the local data publication rule to the event information by interpreting the set of data nodes within a domain context of first domain 306 to identify sensitive information in the event information that is disallowed by the local data publication rule. Metadata engine 312 interprets the set of data nodes, identifying rules and properties for the local data publication rule that are indicated within the plurality of data nodes. Metadata engine 312 generates the edited event information according to the rules and properties indicated within the plurality of data nodes.

In one illustrative example, metadata engine 312 interprets the set of data nodes to form a syntax tree. Metadata engine 312 enters the syntax tree and the event information into an abstract syntax tree interpreter, avoiding a compiler operation to generate computer code for implementing the local data publication rule. Executing the abstract syntax tree interpreter produces a result without using executable code to achieve the result.

Outbound global data synchronization reactor 310 publishes the edited event message to global message pipeline 314 for consumption by corresponding services in remote region 316. Inbound global data synchronization reactor 318 listens for the edited event message in the global message pipeline 314. In response to receiving the edited event message, inbound global data synchronization reactor 318 generates an event command. The event command comprises the edited event information. Inbound global data synchronization reactor 318 publishes the event command by sending the event command to second domain command pipeline 320.

Application 322 in remote region 324 listens for the event command in second domain command pipeline 320. Application 322 performs the first action in the corresponding domain of remote region 324 in response to receiving the edited event information.

Turning to FIG. 4, an illustration of a flowchart of a process for maintaining data synchronization across services provided in a local region is depicted in accordance with an illustrative embodiment. For example, without limitation, process 400 may be implemented using an outbound global data synchronization reactor, such as data synchronization reactor 166 of information processing system 120 in FIG. 1.

Process 400 may begin by listening for an event message in a first domain message pipeline (step 410). The event message may comprise an event name and a message payload comprising event information for an event.

The process receives the event message (step 420). In response to receiving the event, the process applies a local data publication rule to the event information to generate edited event information (step 430). The local data publication rule comprises a set of data nodes that are composed into a structured data object according to a domain specific language.

The process generates an edited event message (step 440). The edited event message may comprise the event name and a message payload comprising the edited event information.

The process publishes the edited event message by sending the edited event message to a global message pipeline (step 450), with process 400 terminating thereafter.

Turning to FIG. 5, an illustration of a flowchart of a process for generating an event for data synchronization across services provided to different geographic regions is depicted in accordance with an illustrative embodiment. For example, without limitation, process 500 may be implemented using an application executing within a region, such as one or more of application 102, 104, 106 of information processing system 120 in FIG. 1.

Process 500 may begin by receiving event information for an event (step 510). In response to receiving the event information, process 500 performs a first action in a first domain (step 520).

Process 500 generates an event message (step 530). The event message comprises an event name and a message payload. The message payload comprises the event information. Thereafter, process 500 publishes the event message by sending the event message to the first domain message pipeline (step 540), with process 500 terminating thereafter.

Turning to FIG. 6, an illustration of a flowchart of a process for maintaining data synchronization across services provided in a remote region is depicted in accordance with an illustrative embodiment. For example, without limitation, process 600 may be implemented using an inbound global data synchronization reactor, such as data synchronization reactor 318 in FIG. 3.

Process 600 may begin by listening for an edited event message in a global message pipeline (step 610). In response to receiving the edited event message (step 620), the process generates an event command (step 630). The event command comprises the edited event information.

Process 600 publishes the event command within the region by sending the event command to a second domain command pipeline (step 640), with process 600 terminating thereafter. An application in a second domain, listening for the event command in the second domain command pipeline, performs the first action in the second domain in response to receiving the edited event information.

Figure 7:
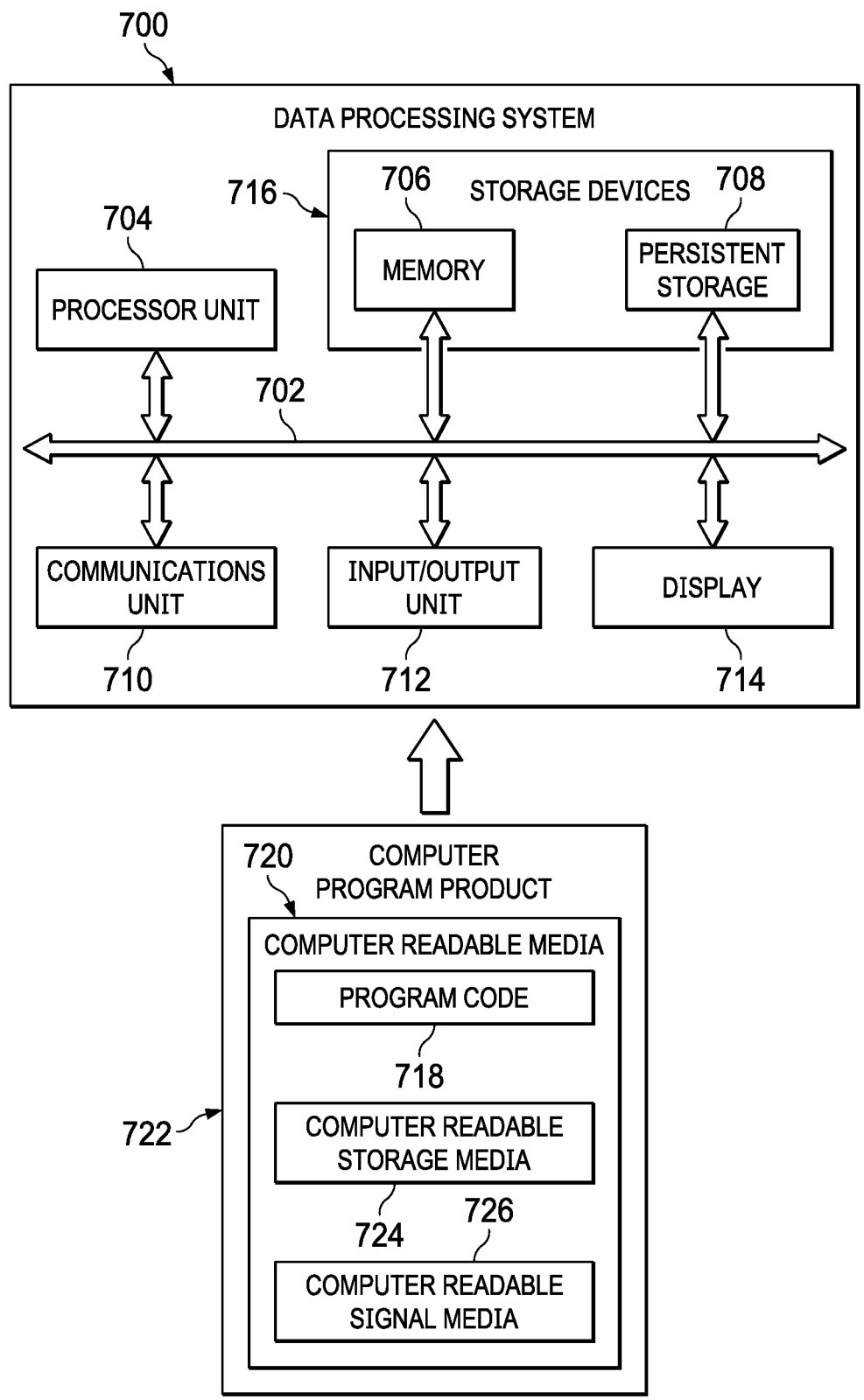
FIG. 7 is a flowchart of a process for receiving an event message by an application in accordance with an illustrative embodiment.

Turning to FIG. 7, an illustration of block diagram of a data processing system is depicted in accordance with an illustrative embodiment. Data processing system 700 in FIG. 7 is an example of a data processing system that may be used to implement the illustrative embodiments, such as in FIG. 1 through FIG. 3, or any other module or system or process disclosed herein. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. This software may be an associative memory, content addressable memory, or software for implementing the processes described elsewhere herein. Thus, for example, software loaded into memory 706 may be software for executing one or more of process 400 of FIG. 4, process 500 of FIG. 5, and process 600 of FIG. 6. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

As another example, a storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706, or a cache, such as found in an interface and memory controller hub that may be present in communications fabric 702.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of maintaining data synchronization across services provided to different geographic regions having different data privacy regulations, the method comprising:
   listening, by an outbound global data synchronization reactor, for an event message in a first domain message pipeline, wherein the event message comprises an event name and a message payload comprising event information for an event;
   receiving the event message by the outbound global data synchronization reactor;
   applying a local data publication rule to the event information, by the outbound global data synchronization reactor, to generate edited event information, wherein the local data publication rule comprises a set of data nodes that are composed into a structured data object according to a domain specific language;
   generating an edited event message, by the outbound global data synchronization reactor, wherein the edited event message comprises the event name and a message payload comprising the edited event information;
   publishing the edited event message, by the outbound global data synchronization reactor, by sending the edited event message to a global message pipeline;
   listening, by an inbound global data synchronization reactor, for the edited event message in the global message pipeline;
   receiving the edited event message by the inbound global data synchronization reactor;
   generating an event command, by the inbound global data synchronization reactor, wherein the event command comprises the edited event information;
   publishing the event command, by the inbound global data synchronization reactor; and
   sending the event command to a second domain command pipeline, wherein an application in a second domain, listening for the event command in the second domain command pipeline, performs a first action in the second domain in response to receiving the edited event information.

2. The method of claim 1, further comprising:
   receiving, by an application in the first domain, event information for an event;
   performing a first action in the first domain, by the application in the first domain, in response to receiving the event information;
   generating an event message, by the application in the first domain, wherein the event message comprises an event name and a message payload, wherein the message payload comprises the event information; and
   publishing the event message, by the application in the first domain, by sending the event message to the first domain message pipeline.

3. The method of claim 1, wherein both the first domain message pipeline and the global message pipeline is a stream processing platform.

4. The method of claim 1, wherein the event is a business event.

5. The method of claim 1, wherein the application is a miniapp in a human capital management system.

6. The method of claim 1, wherein applying the local data publication rule to the event information further comprises:

interpreting the set of data nodes within a domain context of the first domain to identify sensitive information in the event information that is disallowed by the local data publication rule.

7. The method of claim 6, wherein interpreting the set of data nodes further comprises:
identifying rules and properties for the local data publication rule, wherein the rules and properties are indicated within the set of data nodes; and
wherein generating the edited event information further comprises:
generating the edited event information according to the rules and properties indicated within the set of data nodes.

8. The method of claim 6, wherein interpreting the set of data nodes forms a syntax tree, the method further comprising:
entering the syntax tree and the event information into an abstract syntax tree interpreter, wherein a compiler operation to generate computer code for implementing the local data publication rule is avoided, and wherein executing the abstract syntax tree interpreter produces a result without using executable code to achieve the result.

9. A computer system for maintaining data synchronization across services provided to different geographic regions having different data publication regulations, the computer system comprising:
a set of hardware processors;
an outbound global data synchronization reactor in a first domain, wherein the outbound global data synchronization reactor:
listens for an event message in a first domain message pipeline, wherein the event message comprises an event name and a message payload comprising event information for an event;
receives the event message;
applies a local data publication rule to the event information, by the outbound global data synchronization reactor, to generate edited event information, wherein the local data publication rule comprises a set of data nodes that are composed into a structured data object according to a domain specific language;
generates an edited event message, wherein the edited event message comprises the event name and a message payload comprising the edited event information; and
publishes the edited event message by sending the edited event message to a global message pipeline; and
an inbound global data synchronization reactor in a second domain, wherein the inbound global data synchronization reactor:
listens, by an inbound global data synchronization reactor, for the edited event message in the global message pipeline;
receives the edited event message by the inbound global data synchronization reactor;
generates an event command, by the inbound global data synchronization reactor, wherein the event command comprises the edited event information;
publishes the event command, by the inbound global data synchronization reactor; and
sends the event command to a second domain command pipeline, wherein an application in a second domain, listening for the event command in the second domain command pipeline, performs a first action in the second domain in response to receiving the edited event information.

10. The computer system of claim 9, further comprising an application, wherein the application:
receives event information for an event in the first domain;
performs a first action in the first domain in response to receiving the event information;
generates an event message in the first domain, wherein the event message comprises an event name and a message payload, wherein the message payload comprises the event information; and
publishes the event message in the first domain by sending the event message to the first domain message pipeline.

11. The computer system of claim 9, wherein both the first domain message pipeline and the global message pipeline is a stream processing platform.

12. The computer system of claim 9, wherein the event is a business event.

13. The computer system of claim 9, wherein the application is a miniapp in a human capital management system.

14. The computer system of claim 9, wherein in applying the local data publication rule to the event information, the outbound global data synchronization reactor further:
interprets the set of data nodes within a domain context of the first domain to identify sensitive information in the event information that is disallowed by the local data publication rule.

15. The computer system of claim 14, wherein in interpreting the set of data nodes, the outbound global data synchronization reactor further:
identifies rules and properties for the local data publication rule, wherein the rules and properties are indicated within the set of data nodes; and
wherein in generating the edited event information, the outbound global data synchronization reactor further:
generates the edited event information according to the rules and properties indicated within the set of data nodes.

16. The computer system of claim 15, wherein interpreting the set of data nodes forms a syntax tree, the outbound global data synchronization reactor further:
entering the syntax tree and the event information into an abstract syntax tree interpreter, wherein a compiler operation to generate computer code for implementing the local data publication rule is avoided, and wherein executing the abstract syntax tree interpreter produces a result without using executable code to achieve the result.

17. A computer program product for maintaining data synchronization across services provided to different geographic regions having different data publication regulations, the computer program product comprising:
a non-transitory computer readable storage media having program code stored thereon;
program code, stored on the computer readable storage media, for listening, by an outbound global data synchronization reactor, for an event message in a first domain message pipeline, wherein the event message comprises an event name and a message payload comprising event information for an event;
program code, stored on the computer readable storage media, for receiving the event message by the outbound global data synchronization reactor;
program code, stored on the computer readable storage media, for applying a local data publication rule to the event information, by the outbound global data synchronization reactor, to generate edited event information, wherein the local data publication rule comprises a set of data nodes that are composed into a structured data object according to a domain specific language;

program code, stored on the computer readable storage media, for generating an edited event message, by the outbound global data synchronization reactor, wherein the edited event message comprises the event name and a message payload comprising the edited event information;

program code, stored on the computer readable storage media, for publishing the edited event message, by the outbound global data synchronization reactor, by sending the edited event message to a global message pipeline;

program code, stored on the computer readable storage media, for listening, by an inbound global data synchronization reactor, for listening for the edited event message in the global message pipeline;

program code, stored on the computer readable storage media, for receiving the edited event message by the inbound global data synchronization reactor;

program code, stored on the computer readable storage media, for generating an event command, by the inbound global data synchronization reactor, wherein the event command comprises the edited event information;

program code, stored on the computer readable storage media, for publishing the event command, by the inbound global data synchronization reactor; and program code, stored on the computer readable storage media, for sending the event command to a second domain command pipeline, wherein an application in a second domain, listening for the event command in the second domain command pipeline, performs a first action in the second domain in response to receiving the edited event information.

18. The computer program product of claim 17, further comprising:

program code, stored on the computer readable storage media, for receiving, by an application in the first domain, event information for an event;

program code, stored on the computer readable storage media, for performing a first action in the first domain, by the application in the first domain, in response to receiving the event information;

program code, stored on the computer readable storage media, for generating an event message, by the application in the first domain, wherein the event message comprises an event name and a message payload, wherein the message payload comprises the event information; and program code, stored on the computer readable storage media, for publishing the event message, by the application in the first domain, by sending the event message to the first domain message pipeline.

19. The computer program product of claim 17, wherein both the first domain message pipeline and the global message pipeline is a stream processing platform.

20. The computer program product of claim 17, wherein the event is a business event.

21. The computer program product of claim 17, wherein an application is a miniapp in a human capital management system.

22. The computer program product of claim 17, wherein the program code for applying the local data publication rule to the event information further comprises:

program code, stored on the computer readable storage media, for interpreting the set of data nodes within a domain context of the first domain to identify sensitive information in the event information that is disallowed by the local data publication rule.

23. The computer program product of claim 17, wherein the program code for interpreting the set of data nodes further comprises:

program code, stored on the computer readable storage media, for identifying rules and properties for the local data publication rule, wherein the rules and properties are indicated within a plurality of data nodes; and wherein the program code for generating the edited event information further comprises:

program code, stored on the computer readable storage media, for generating the edited event information according to the rules and properties indicated within the plurality of data nodes.

24. The computer program product of claim 23, wherein interpreting the set of data nodes forms a syntax tree, the computer program product further comprising:

program code, stored on the computer readable storage media, for entering the syntax tree and the event information into an abstract syntax tree interpreter, wherein a compiler operation to generate computer code for implementing the local data publication rule is avoided, and wherein executing the abstract syntax tree interpreter produces a result without using executable code to achieve the result.

25. The method of claim 1, wherein the application is a miniapp in an identity management system.

26. The computer system of claim 9, wherein the application is a miniapp in an identity management system.

27. The computer program product of claim 17, wherein an application is a miniapp in an identity management system.

* * * * *